US010349316B2

(12) United States Patent
Wang

(10) Patent No.: US 10,349,316 B2
(45) Date of Patent: Jul. 9, 2019

(54) METHOD IN COMMUNICATION DEVICE FOR STARTING A CIRCUIT SWITCHED FALLBACK IN WIRELESS COMMUNICATION SYSTEM

(71) Applicant: Telefonaktiebolaget LM Ericsson (publ), Stockholm (SE)

(72) Inventor: Xiaohui Wang, Limhamn (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

(21) Appl. No.: 15/514,496

(22) PCT Filed: Sep. 26, 2014

(86) PCT No.: PCT/EP2014/070673
§ 371 (c)(1),
(2) Date: Mar. 24, 2017

(87) PCT Pub. No.: WO2016/045747
PCT Pub. Date: Mar. 31, 2016

(65) Prior Publication Data
US 2017/0289860 A1    Oct. 5, 2017

(51) Int. Cl.
*H04W 36/00* (2009.01)
*H04W 36/08* (2009.01)
*H04W 80/10* (2009.01)

(52) U.S. Cl.
CPC ... *H04W 36/0022* (2013.01); *H04W 36/0033* (2013.01); *H04W 36/08* (2013.01); *H04W 80/10* (2013.01)

(58) Field of Classification Search
CPC ......... H04W 36/0022; H04W 36/0033; H04W 36/08; H04W 80/10
See application file for complete search history.

(56) References Cited

U.S. PATENT DOCUMENTS

2009/0036098 A1\* 2/2009 Lee ................ H04W 48/20
455/411
2011/0176536 A1    7/2011 De Franca Lima et al.
(Continued)

FOREIGN PATENT DOCUMENTS

WO    2011053849 A2    5/2011
WO    2011056264 A1    5/2011
WO    2014107054 A1    7/2014

OTHER PUBLICATIONS

PCT International Search Report, dated Jun. 1, 2015, in connection with International Application No. PCT/EP2014/070673, all pages.
(Continued)

*Primary Examiner* — Kashif Siddiqui
(74) *Attorney, Agent, or Firm* — Leffler Intellectual Property Law, PLLC

(57) ABSTRACT

A method in a wireless communication device for starting a Circuit Switched FallBack, CSFB, in a wireless communication system is disclosed. The wireless communication system comprises one or more Long-Term Evolution, LTE, networks and one or more 2nd or 3rd Generation, 2G/3G, networks. When the communication device is camping in an LTE network and starts a Circuit Switched, CS, service, the wireless communication device sends a CSFB request to a Mobility Management entity, MME, via an access node in the LTE network and starts a first timer and/or a first counter upon sending the CSFB request. When the first timer and/or the first counter is expired and no response to the CSFB request has been received from the LTE networks, it starts a cell search procedure in the 2G/3G networks and starts the CS service via a target cell selected by the cell search procedure in the 2G/3G networks.

6 Claims, 3 Drawing Sheets

(56) References Cited

U.S. PATENT DOCUMENTS

| | | |
|---|---|---|
| 2012/0120789 A1 | 5/2012 | Ramachandran et al. |
| 2013/0301466 A1 | 11/2013 | Nenner |
| 2013/0331054 A1* | 12/2013 | Kodali .................. H04W 36/14 |
| | | 455/404.1 |
| 2014/0099955 A1 | 4/2014 | Nukala et al. |
| 2014/0293960 A1* | 10/2014 | Su .................... H04W 36/0022 |
| | | 370/331 |
| 2015/0117401 A1* | 4/2015 | Jiang .................... H04W 76/18 |
| | | 370/331 |
| 2016/0007239 A1* | 1/2016 | Manepalli ......... H04W 36/0022 |
| | | 370/331 |

OTHER PUBLICATIONS

PCT Written Opinion, dated Jun. 1, 2015, in connection with International Application No. PCT/EP2014/070673, all pages.

3GPP TSG CT WG1 Meeting #55bis, C1-084014, Phoenix, Arizona (USA), Oct. 6-10, 2008, NTT DoCoMo, Discussion about NAS timer for CSFB, 4 pages.

3GPP TSG CT WG1 Meeting #55, C1-083138, Budapest, Hungary, Aug. 18-22, 2008, NTT DoCoMo, Pseudo-CR on CSFB timer, 3 pages.

3GPP TSG CT Meeting #42, CP-080xyz, Athens, Greece, Dec. 3-5, 2008, TS 24.301 V2.0.0 Non-Access-Stratum (NAS) protocol for Evolved Packet System (EPS); Stage 3—for CT Approval, 3 pages.

* cited by examiner

METHOD IN COMMUNICATION DEVICE FOR STARTING A CIRCUIT SWITCHED FALLBACK IN WIRELESS COMMUNICATION SYSTEM

TECHNICAL FIELD

Embodiments herein relate to a method in a wireless communication device. In particular, they relate to a method in a wireless communication device for starting a Circuit Switched FallBack (CSFB) in a wireless communication system.

BACKGROUND

Wireless communication devices such as User Equipments (UE) are also known as e.g. wireless terminals, mobile terminals and/or mobile stations. Wireless communication devices are enabled to communicate or operate wirelessly in a Heterogeneous wireless communication system comprising multiple networks or Heterogeneous Networks (HetNet) with access nodes, such as a cellular communications network comprising Second/Third Generation (2G/3G) network, 3G Long Term Evolution (LTE) network, Worldwide interoperability for Microwave Access (Wi-MAX) network, etc.

Wireless communication devices may further be referred to as mobile telephones, cellular telephones, smart phones, laptops, tablet computers or phablets with wireless capability, just to mention some further examples. The wireless communication device in the present context may be, for example, portable, pocket-storable, hand-held, computer-comprised, or vehicle-mounted mobile devices, enabled to communicate voice and/or data via an access node with another entity, such as another communication device or a server in the wireless communication system.

When a wireless communication device camping in an LTE network starts a Circuit Switched (CS) service, such as a voice call, it sends a CSFB request to a Mobility Management Entity (MME) via an access node, e.g. an Ehanced NodeB (eNB) in the LTE network. The CSFB is a technology whereby voice services and Short Message Services (SMS) are delivered to LTE communication devices through the use of Global System for Mobile Communications (GSM) or other circuit-switched 2G/3G networks such as Universal Mobile Telecommunications System (UMTS), Code division multiple access (CDMA) 2000 etc. The CSFB is needed because the LTE network is a packet-based all-IP (Internet Protocol) network that cannot support circuit-switched calls. When an LTE communication device is used to make or receive a voice call or SMS, the communication device may "fall back" to the 3G or 2G network to complete the call or to deliver the SMS text message.

After receiving the CSFB request from the wireless communication device, the MME sends a response with target 2G/3G cell data such as frequency for carrying out the CS service, to the wireless communication device via the eNB, which redirects the wireless communication device to the 2G/3G network to carry out the CS service.

A problem arises when the wireless communication device does not get the response with the target CS cell data from the MME or eNB of the LTE network. This may happen when the wireless communication device is at a coverage edge of an LTE network cell where the message exchange between the wireless communication device and the LTE network is not reliable. The problem becomes more serious especially when the LTE network generally prefers the wireless communication device to camp in the LTE network over the 2G/3G network.

SUMMARY

Therefore it is an object of embodiments herein to provide improved voice and CS services for users of an LTE communication device in a wireless communication system.

According to a first aspect of embodiments herein, the object is achieved by a method in a wireless communication device for starting a Circuit Switched FallBack, CSFB, in a wireless communication system. The wireless communication system comprises one or more Long-Term Evolution (LTE) networks and one or more 2nd or 3rd Generation (2G/3G) networks. When the wireless communication device is camping in an LTE network and starts a Circuit Switched (CS) service, such as a voice call, the wireless communication device sends a CSFB request to a Mobility Management entity (MME) via an access node in the LTE network. Upon sending the CSFB request, the wireless communication device starts a first timer and/or a first counter. When the first timer and/or the first counter is expired and no response to the CSFB request has been received from the LTE network, the wireless communication device starts a cell search procedure in the 2G/3G networks and starts the CS service via a target cell selected by the cell search procedure in the 2G/3G networks.

According to a second aspect of embodiments herein, the object is achieved by a communication device for starting a Circuit Switched FallBack, CSFB, in a wireless communication system. The wireless communication system comprises one or more Long-Term Evolution (LTE) networks and one or more 2nd or 3rd Generation (2G/3G) networks. When the wireless communication device is camping in an LTE network and starts a Circuit Switched (CS) service, such as a voice call, the wireless communication device is configured to send a CSFB request to a Mobility Management entity (MME) via an access node in the LTE network. The wireless communication device is further configured to start a first timer and/or a first counter upon sending the CSFB request. The wireless communication device is further configured to start a cell search procedure in the 2G/3G networks and start the CS service via a target cell selected by the cell search procedure in the 2G/3G networks, when the first timer and/or the first counter is expired and no response to the CSFB request has been received from the LTE networks.

According to embodiments herein, the wireless communication device starts a timer or counter when requesting the CSFB to the LTE network. If no response received from the LTE network when the timer or counter is expired, the wireless communication device detaches the LTE network and starts a cell search procedure in the 2G/3G networks and selects the most suitable cell from the neighbor 2G/3G network cell list obtained from the latest broadcast information blocks. A normal CS call is initiated via the 2G/3G network when a connection to a 2G/3G network cell is established. In this way, the wireless communication device is able to start CSFB autonomously if the redirect procedure performed by the LTE network fails, i.e. the wireless communication device moves to the 2G/3G network without being redirected by the LTE network. In this way, a call or SMS will be made without failure or being delayed for a too long time for the users of the LTE communication devices.

Thus, embodiments herein provide an method for improving voice and CS services for the users of LTE communication devices in a wireless communication system, especially when the LTE communication devices are in a coverage edge of an LTE network cell.

BRIEF DESCRIPTION OF THE DRAWINGS

Examples of embodiments herein are described in more detail with reference to attached drawings in which.

DETAILED DESCRIPTION

Figure 1:
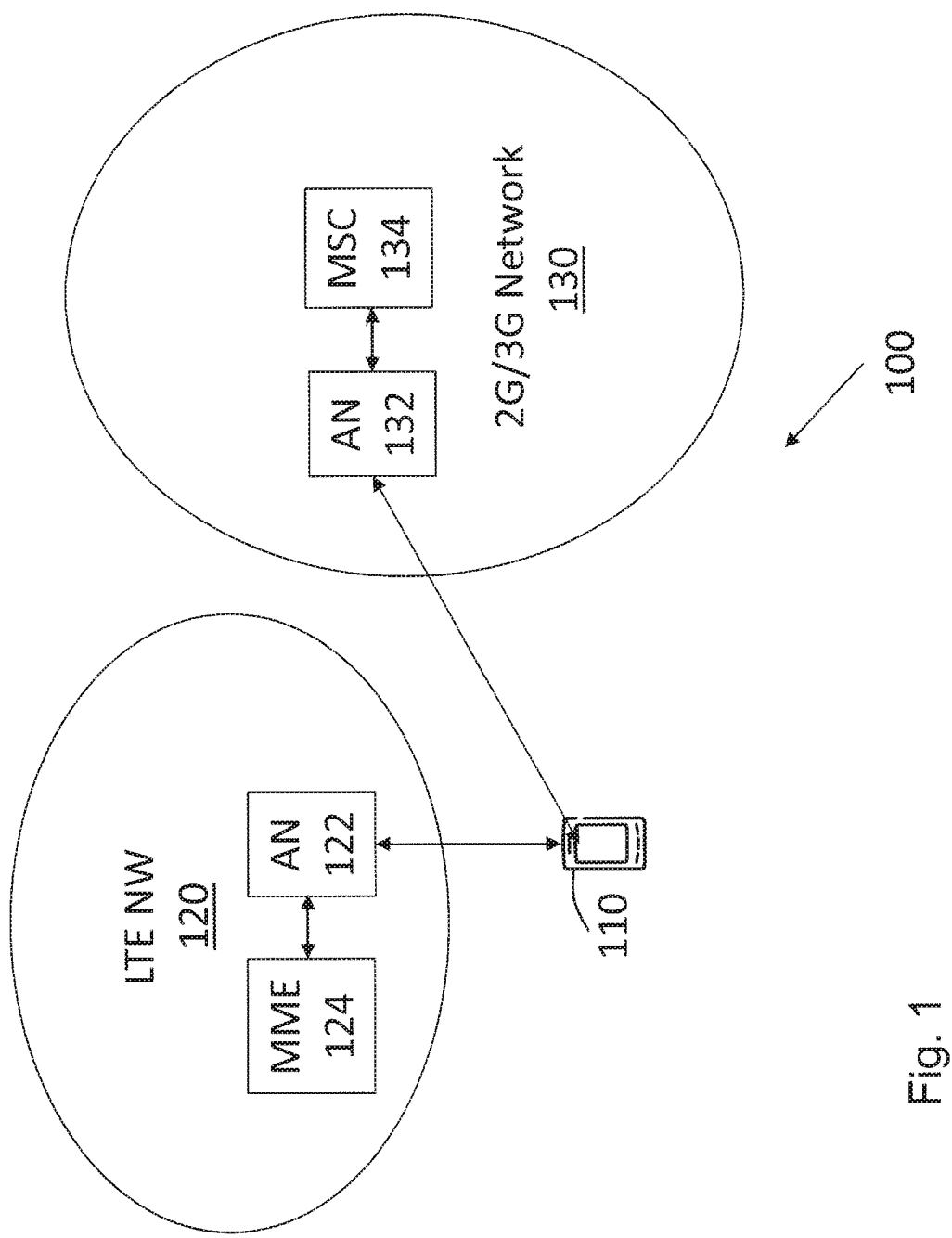
FIG. 1 is a schematic block diagram illustrating an example of a wireless communication system.

FIG. 1 depicts an example of a wireless communication system 100 in which embodiments herein may be implemented. The wireless communication system 100 comprises one or more wireless communication networks such as e.g. LTE network, Wideband CDMA (WCDMA), GSM networks, Wimax, UMTS or any 2G/3G cellular networks etc.

A number of wireless communication devices operate in the wireless communication system 100, whereof one, a wireless communication device 110, is shown in FIG. 1. The wireless communication device 110 may, e.g. be a mobile terminal or station or a wireless terminal, a user equipment, a mobile phone, a computer such as e.g. a laptop, a Personal Digital Assistants (PDAs) or a tablet computer, with wireless capability, or any other radio network units capable to communicate over a radio link in a wireless communications network.

The wireless communications system 100 comprises a plurality of networks whereof two, an LTE network 120 and a 2G/3G network 130 are depicted in FIG. 1. The LTE network 120 comprises at least one Access Node, AN 122, which may be an eNB, an eNodeB, or a Home Node B, and Home eNode B or any other network node capable to serve a user equipment or a machine type communication device in a wireless communications network. The LTE network 120 may further comprise other modules or units which enable communications between the wireless communication device 110 and the LTE network 120, whereof only a Mobility Management Entity, MME 124 is depicted in FIG. 1.

The 2G/3G network 130 comprises at least one Access Node, AN 132, which may be a Radio Base Station (RBS) or Radio Network Controller (RNC), Base Transceiver Station (BTS) or Base Station Controller (BSC) or any other network node capable to serve a user equipment or a machine type communication device in a wireless communications network. The 2G/3G network 130 may further comprise other modules or units which enable communications between the communication device 110 and the 2G/3G network 130, whereof only a Mobile Switch Center, MSC 134 is depicted in FIG. 1.

Figures 2, 3:
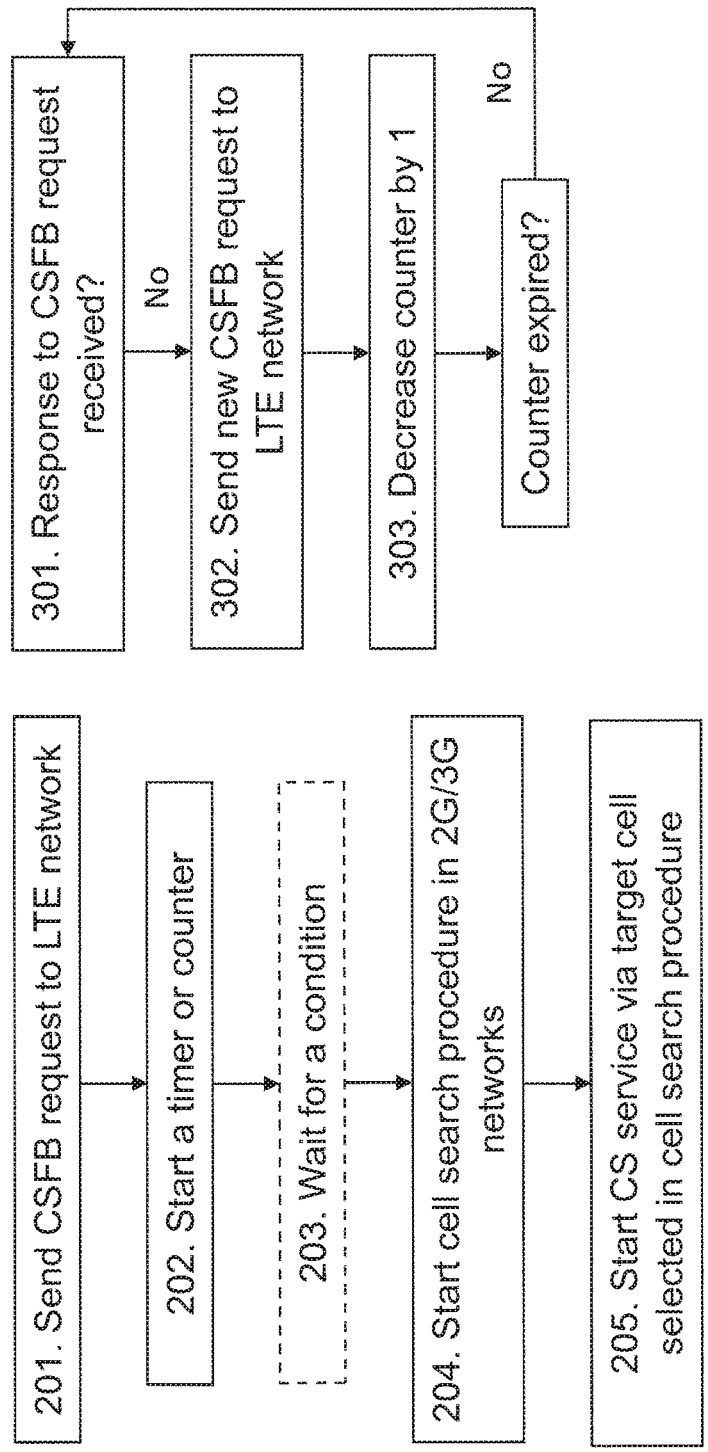
FIG. 2 is a flowchart depicting one embodiment of a method in a communication device.
FIG. 3 is a flowchart depicting one embodiment of a method in a communication device.

Example of embodiments of a method in the wireless communication device 110 for starting a Circuit Switched FallBack, CSFB, in a wireless communication system 100 will now be described with reference to FIG. 2. As mentioned above, the wireless communication device 110 operates in the wireless communication system 100 and the wireless communication system 100 comprises one or more LTE networks 120 and one or more 2G/3G networks 130. Further the communication device 110 is camping in the LTE network 120. The method comprises the following actions, which actions may be taken in any suitable order.

Action 201

When a wireless communication device 110 camping in the LTE network 120 starts a CS service, such as a voice call, it sends a CSFB request to the Mobility Management entity, MME 122, via an access node 124 in the LTE network 120.

Action 202

Upon sending the CSFB request, the wireless communication device 110 starts a first timer and/or a first counter. The wireless communication device 110 may only start the first timer, or only start the first counter, or start both the first timer and the first counter.

Action 203

After the first timer and/or the first counter is started, the wireless communication device 110 waits for a condition to be fulfilled. The condition to be fulfilled may be one out of: receiving a response from the MME 122 via the access node 124 in the LTE network 120, the first timer is expired, or the first counter is expired. If the response has been received from the MME 122 via the access node 124 in the LTE network 120, the wireless communication device 110 will be directed to the 2G/3G network 130 by the LTE network 120 to carry out the CS service. A normal CS call is carried out via the access node AN 132 by communication with the MSC 134 in the 2G/3G network 130.

Action 204

When the first timer and/or the first counter is expired and no response to the CSFB request has been received from the LTE networks 120, the wireless communication device 110 starts a cell search procedure in the 2G/3G networks 130. If no response is received from the LTE network 120, the redirect procedure performed by the LTE network 120 fails, then the wireless communication device 110 will start CSFB autonomously by searching a suitable or target 2G/3G network cell to communicate with.

Action 205

After a target 2G/3G network cell is selected, the wireless communication device 110 starts the CS service via the target cell. For example, a normal CS call is carried out when a connection to the target cell is established via an access node, e.g. AN 132.

According to some embodiments, the first counter is set to a pre-defined number of CSFB requests, see the above Action 203, where the wireless communication device 110 waits for a condition to be fulfilled, further comprises the following actions described with reference to FIG. 3:

Action 301

The wireless communication device 110 checks if a response to the CSFB request has been received from the LTE network 120.

Action 302

When no response to the CSFB request has been received from the LTE network 120, the wireless communication device 110 sends a new CSFB request to the MME 120 via the access node 124 in the LTE Network 120.

Action 303

The wireless communication device 110 decreases the first counter by 1.

If the first counter is not expired, the wireless communication device 110 further repeats the above actions 301-303, that is checking if a response is received, sending a new CSFB request and decreasing the first counter by 1 until the first counter is expired.

Figure 4:
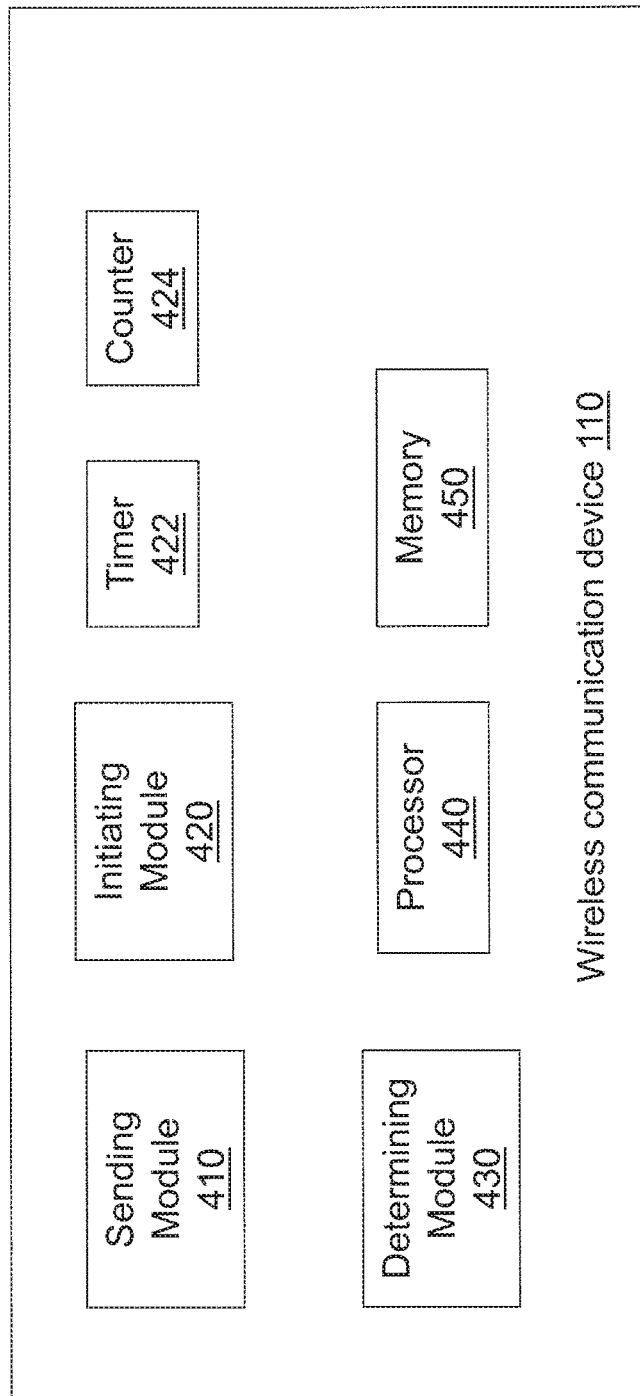
FIG. 4 is a schematic block diagram illustrating embodiments of a wireless communication device.

To perform the method actions in the communication device 110 for starting a Circuit Switched FallBack, CSFB, in a wireless communication system 100, described above in relation to FIGS. 2-3, the communication device 110 comprises the following circuits or modules depicted in FIG. 4, As mentioned above, the communication device 110 operates in the wireless communication system 100. As mentioned above, the wireless communications system 100 comprises one or more Long-Term Evolution networks, LTE network 120 and one or more 2nd or 3rd Generation networks, 2G/3G network 130. Further the communication device 110 is camping in an LTE network 120.

The wireless communication device 110 is configured to, e.g. by means of a sending module 410, send a CSFB request to a Mobility Management entity, MME 122, via an access node 124 in the LTE network 120.

The wireless communication device 110 is further configured to, e.g. by means of a initiating module 420, start a first timer 422 and/or a first counter 424 upon sending the CSFB request.

The wireless communication device 110 is further configured to, e.g. by means of the initiating module 420, start a cell search procedure in the 2G/3G networks 130 when the first timer 422 and/or the first counter 424 is expired and no response to the CSFB request has been received from the LTE networks 120. Further, the wireless communication device 110 is configured to, e.g. by means of the initiating module 420, start a Circuit Switched, CS, service via a target cell selected by the cell search procedure in the 2G/3G networks 130.

According to some embodiments, the wireless communication device is further configured to wait for a condition to be fulfilled and the condition to be fulfilled comprises one out of: receiving a response from the MME 122 via the access node 124 in the LTE network 120, the first timer 422 is expired, or the first counter 424 is expired.

According to some embodiments, the first counter 424 is set to a pre-defined number of CSFB requests, and the wireless communication device 110 is further configured to, e.g. by means of a determining module 430, check if a response to the CSFB request has been received from the LTE network 120. The wireless communication device 110 is further configured to, when no response to the CSFB request has been received from the LTE network 120, send a new CSFB request to the MME 120 via the access node 124 in the LTE Network 120 and decrease the first counter 424 by 1. Further, the wireless communication device 110 is configured to repeat above checking, sending and decreasing actions until the first counter 424 is expired.

Those skilled in the art will appreciate that the sending module 410, initiating module 420, first timer 422, first counter 424 and determining module 430, described above may be referred to one module, a combination of analog and digital circuits, one or more processors, such as processor 440, depicted in FIG. 4, configured with software and/or firmware and/or any other digital hardware performing the function of each module. One or more of these processors, the combination of analog and digital circuits as well as the other digital hardware, may be included in a single application-specific integrated circuitry (ASIC), or several processors and various analog/digital hardware may be distributed among several separate components, whether individually packaged or assembled into a system-on-a-chip (SoC).

The wireless communication device 110 may further comprise a memory 450 comprising one or more memory units. The memory 450 is arranged to be used to store information, e.g. a cell list, the pre-defined number of CSFB requests in the first counter, a time defined in the first timer or other measurements and data, as well as configurations to perform the methods herein when being executed in the wireless communication device 110.

The embodiments herein in the wireless communication device 110 for starting a Circuit Switched FallBack, CSFB, in a wireless communication system 100 may be implemented through one or more processors, such as the processor 440 in the wireless communication device 110, together with computer program code for performing the functions and actions of the embodiments herein. The program code mentioned above may also be provided as a computer program product, for instance in the form of a data carrier carrying computer program code for performing the embodiments herein when being loaded into the wireless communication device 110. One such carrier may be in the form of a CD ROM disc. It is however feasible with other data carriers such as a memory stick. The computer program code may furthermore be provided as pure program code on a server and downloaded to the wireless communication device 110.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method in a wireless communication device for starting a Circuit Switched FallBack, CSFB, in a wireless communication system, wherein the wireless communication system comprises one or more Long-Term Evolution, LTE, networks and one or more 2nd or 3rd Generation, 2G/3G, networks, and wherein the wireless communication device is camping in an LTE network, the method comprising:
    sending a CSFB request to a Mobility Management entity, MME, via an access node in the LTE network;
    checking whether a response to the CSFB request has been received from the LTE network, and when no response to the CSFB request has been received from the LTE network,
    sending a new CSFB request to the MME via the access node in the LTE Network;
    repeating steps checking and sending until a pre-defined number of CSFB requests have been made;
    when the pre-defined number of CSFB requests have been made and no response to the CSFB request has been received from the LTE network,
    starting a cell search procedure in the 2G/3G networks; and
    starting a Circuit Switched, CS, service via a target cell selected by the cell search procedure in the 2G/3G networks.

2. The method according to claim 1, wherein the method further comprises:
    performing the checking when a pre-defined amount of time has elapsed since a most-recent sending.

3. The method according to claim 1, comprising:
    stepping a counter each time a CSFB request is made; and
    using the counter to indicate when the pre-defined number of CSFB requests have been made.

4. A wireless communication device for starting a Circuit Switched FallBack, CSFB, in a wireless communication system, wherein the wireless communication system comprises one or more Long-Term Evolution, LTE, networks and one or more 2nd or 3rd Generation, 2G/3G, networks, and wherein the communication device is camping in an LTE network, the wireless communication device is configured to:

send a CSFB request to a Mobility Management entity, MME, via an access node in the LTE network;

check whether a response to the CSFB request has been received from the LTE network, and when no response to the CSFB request has been received from the LTE network, send a new CSFB request to the MME via the access node in the LTE Network;

repeat above checking and sending until a pre-defined number of CSFB requests have been made;

when the pre-defined number of CSFB requests have been made and no response to the CSFB request has been received from the LTE network, start a cell search procedure in the 2G/3G networks; and start a Circuit Switched, CS, service via a target cell selected by the cell search procedure in the 2G/3G networks.

5. The wireless communication device according to claim 4, wherein the wireless communication device is further configured to:

perform the above check when a pre-defined amount of time has elapsed since a most-recent sending.

6. The wireless communication device according to claim 4, wherein the wireless communication device is further configured to:

step a counter each time a CSFB request is made; and use the counter to indicate when the pre-defined number of CSFB requests have been made.

\* \* \* \* \*